United States Patent
Lee et al.

(10) Patent No.: US 9,191,641 B2
(45) Date of Patent: Nov. 17, 2015

(54) METHOD AND APPARATUS FOR PROVIDING A VIRTUAL CHANNEL SERVICE

(75) Inventors: You-Jin Lee, Seoul (KR); Sung-Woo Nam, Gyeongsangnam-do (KR); Tae-Min Ahn, Seoul (KR); Hyo-Geun Wang, Seoul (KR); Hyun-Kyu Lee, Seoul (KR); Ji-Won Choi, Gyeonggi-do (KR)

(73) Assignee: Alticast Corporation, Seoul (KR)

( * ) Notice: Subject to any disclaimer, the term of this patent is extended or adjusted under 35 U.S.C. 154(b) by 994 days.

(21) Appl. No.: 12/420,180

(22) Filed: Apr. 8, 2009

(65) Prior Publication Data

US 2009/0254963 A1   Oct. 8, 2009

(30) Foreign Application Priority Data

Apr. 8, 2008 (KR) .................. 10-2008-0032820

(51) Int. Cl.
| | |
|---|---|
| *G06F 3/00* | (2006.01) |
| *G06F 13/00* | (2006.01) |
| *H04N 5/445* | (2011.01) |
| *H04N 9/804* | (2006.01) |
| *H04N 5/45* | (2011.01) |
| *H04N 5/775* | (2006.01) |
| *H04N 5/781* | (2006.01) |
| *H04N 21/431* | (2011.01) |
| *H04N 21/432* | (2011.01) |
| *H04N 21/482* | (2011.01) |

(52) U.S. Cl.
CPC ............. *H04N 9/8042* (2013.01); *H04N 5/45* (2013.01); *H04N 5/775* (2013.01); *H04N 5/781* (2013.01); *H04N 21/4316* (2013.01); *H04N 21/4325* (2013.01); *H04N 21/4825* (2013.01)

(58) Field of Classification Search
CPC .......... H04N 21/4316; H04N 21/4325; H04N 21/4825; H04N 9/8042
USPC ................. 725/40, 43–49, 52, 58, 61
See application file for complete search history.

(56) References Cited

U.S. PATENT DOCUMENTS

| | | | | |
|---|---|---|---|---|
| 5,534,911 | A * | 7/1996 | Levitan ........................ | 725/46 |
| 6,483,986 | B1 * | 11/2002 | Krapf .......................... | 386/243 |
| 7,017,173 | B1 * | 3/2006 | Armstrong et al. ........... | 725/87 |
| 7,773,860 | B2 * | 8/2010 | Wood et al. ................... | 386/296 |
| 7,827,585 | B2 * | 11/2010 | Hassell et al. ................ | 725/134 |
| 7,861,273 | B2 * | 12/2010 | Fries et al. .................... | 725/80 |
| 2002/0076203 | A1 * | 6/2002 | Takahashi ..................... | 386/83 |
| 2002/0144267 | A1 * | 10/2002 | Gutta et al. .................... | 725/46 |

(Continued)

FOREIGN PATENT DOCUMENTS

| | | | |
|---|---|---|---|
| JP | 2003-153097 A | 5/2003 | |
| JP | 2003-153141 A | 5/2003 | |

(Continued)

*Primary Examiner* — Jason Salce
(74) *Attorney, Agent, or Firm* — Mintz Levin Cohn Ferris Glovsky and Popeo, P.C.; Kongsik Kim; Jonathon Western

(57) ABSTRACT

A method and an apparatus for providing a virtual channel service are disclosed. The method includes maintaining a contents list recorded in a personal video recorder and a virtual channel information, determining a playback order of recorded contents included in the list in accordance with a preset algorithm, and playing back in sequence the recorded contents through a predetermined virtual channel. As a result, a user may approach easily to the recorded contents.

10 Claims, 6 Drawing Sheets

(56) References Cited

U.S. PATENT DOCUMENTS

| | | |
|---|---|---|
| 2003/0041327 A1* | 2/2003 | Newton et al. ............... 725/44 |
| 2003/0067554 A1* | 4/2003 | Klarfeld et al. .............. 348/461 |
| 2003/0163812 A1* | 8/2003 | Tsukamoto et al. ........... 725/39 |
| 2003/0233663 A1* | 12/2003 | Rao et al. .................... 725/131 |
| 2005/0025469 A1* | 2/2005 | Geer et al. ................... 386/125 |
| 2007/0118852 A1* | 5/2007 | Calderwood ................. 725/38 |
| 2008/0196063 A1* | 8/2008 | Shih ............................. 725/40 |
| 2008/0282285 A1* | 11/2008 | Thomas et al. ............... 725/32 |

FOREIGN PATENT DOCUMENTS

| | | |
|---|---|---|
| KR | 10-2001-0170623 | 12/2001 |
| KR | 10-2006-0071666 | 6/2006 |

* cited by examiner recorded contents list

| title | storage time |
|---|---|
| A | one hour |
| B | fifty five minutes |
| C | two hours thirty minutes |
| D | forty minutes |
| ⋮ | |

METHOD AND APPARATUS FOR PROVIDING A VIRTUAL CHANNEL SERVICE

CROSS-REFERENCE TO RELATED APPLICATIONS

This application claims priority from Korean Patent Application No. 2008-32820 filed on Apr. 8, 2008, the contents of which are incorporated herein by reference in its entirety.

TECHNICAL FIELD

The present disclosure relates to a method and an apparatus for providing a virtual channel service, more particularly relates to a method and an apparatus for providing an opportunity that users can approach easily to recorded contents.

RELATED ART

The past broadcasting service is provided through an analog method. However, high definition services have been provided according as a network technique and data processing performance are improved. In addition, data broadcasting services, for receiving in real time request of users and providing various additional services, have been provided.

Furthermore, a personal video recorder PVR service has been provided in recent.

The PVR records information compressed through a digital technique in a hard disk and plays back the recorded information, unlike a VCR for storing a broadcasting signal transmitted from a broadcasting station in a magnetic tape.

Presently, the PVR comes into the spotlight by users who do not view broadcasting at desired time because of its mass storage ability of contents and convenience of recording/playing back method.

The PVR includes a tuner, an analog digital converter ADC, a demultiplexer, an MPEG processor and a hard disk.

In case that the user requests record reservation of broadcasting contents, the PVR converts an analog broadcasting signal received through the tuner into a digital signal, encodes the digital signal to digital data and then stores the encoded digital data in the hard disk.

In the PVR service, the user verifies a recoded contents list shown in FIG. 1 by using an input means such as a remote controller, and views selectively one of contents in the list. However, many contents have been recorded according as storage ability of the hard disk in the PVR is increased, and thus it is inconvenient for the user to search desired contents of many contents through a method of changing a screen or pushing directional keys using the input means.

Additionally, in case that the user wants to play back the recorded contents while he views a broadcasting channel, etc., it is inconvenient for the user to perform a lot of procedures such as a process of selecting a main menu, a process of verifying a recorded contents list, a process of searching a desired contents, etc., so as to select the recorded contents using the remote controller.

In addition, the problem exists in that the user should perform many processes, such as a process of finishing the playing back of the recorded contents, a channel changing selecting process, etc., in order to change to the broadcasting channel while the user views the recorded contents.

The above information disclosed in this Related Art section is only for enhancement of understanding of the background of the invention and therefore it may contain information that does not form the prior art that is already known in this country to a person of ordinary skill in the art.

SUMMARY OF DISCLOSURE

Accordingly, the present invention is provided to substantially obviate one or more problems due to limitations and disadvantages of the related art.

An example embodiment of the present invention provides an apparatus and a method of providing a virtual channel service so that a user views easily recorded contents.

Another example embodiment of the present invention provides an apparatus and a method of providing a virtual channel service so that a user approaches rapidly to recorded contents.

Still another example embodiment of the present invention provides an apparatus and a method of providing a virtual channel service for changing rapidly a broadcasting channel to recorded contents, or changing rapidly the recorded contents to the broadcasting channel.

In one aspect, the present invention provides a method of providing a virtual channel service in a broadcasting terminal, the method comprising: maintaining a list of contents recorded by a personal video recorder and a virtual channel information; determining a playback order of recorded contents included in the list in accordance with a preset algorithm; and playing back in sequence the recorded contents through a predetermined virtual channel.

In another aspect, the present invention provides a method of providing a virtual channel service in a broadcasting terminal, the method comprising: maintaining a list of contents recorded by a personal video recorder and a virtual channel information; playing back recorded contents through a virtual channel; and displaying the recorded contents being played back through the virtual channel on a sub-picture area while a user views a broadcasting channel.

In still another aspect, the present invention provides a recording media readable by a digital processor and having a program of commands executed by the digital processor for the purpose of providing a virtual channel service, the recording media comprising: a first program code configured to maintain a list of contents recorded by a personal video recorder and a virtual channel information; a second program code configured to determine a playback order of recorded contents included in the list in accordance with a preset algorithm; and a third program code configured to play back in sequence the recorded contents through a predetermined virtual channel.

In still another aspect, the present invention provides a method of providing a virtual channel service in a server connected to a broadcasting terminal through a network, the method comprising: receiving transmission request of a virtual channel service application from the broadcasting terminal; and transmitting the requested virtual channel service application to the broadcasting terminal. Here, the virtual channel service application determines a playback order of recorded contents in accordance with a preset algorithm, and plays back in sequence the recorded contents through a predetermined virtual channel.

In still another aspect, the present invention provides a broadcasting terminal comprising: a tuner configured to output selectively a broadcasting signal of a broadcasting channel selected by a user; a demultiplexer configured to output selectively an audio signal and a video signal from the outputted broadcasting signal; a decoder configured to decode the audio signal and the video signal in accordance with a preset algorithm, and output the decoded signal; and a system controller configured to output a control signal corresponding to request of the user. Here, the system controller determines a playback order of recorded contents in accordance with a predetermined algorithm, and output the control signal for playing back in sequence the recorded contents through a predetermined virtual channel.

An apparatus and a method of providing a virtual channel service of the present invention play back recorded contents through a virtual channel, and so a user may view the recorded contents through a channel changing method.

In addition, since the apparatus and a method play back preferentially the recorded contents having high possibility to be selected by the user, satisfaction of the user may be enhanced.

Furthermore, since the recorded contents are shown in a sub-picture area while the user views the broadcasting channel, the user may verify easily the recorded contents and view the recorded contents.

BRIEF DESCRIPTION OF DRAWINGS

Example embodiments of the present invention will become more apparent by describing in detail example embodiments of the present invention with reference to the accompanying drawings, in which.

DETAILED DESCRIPTION

Figures 1, 2:
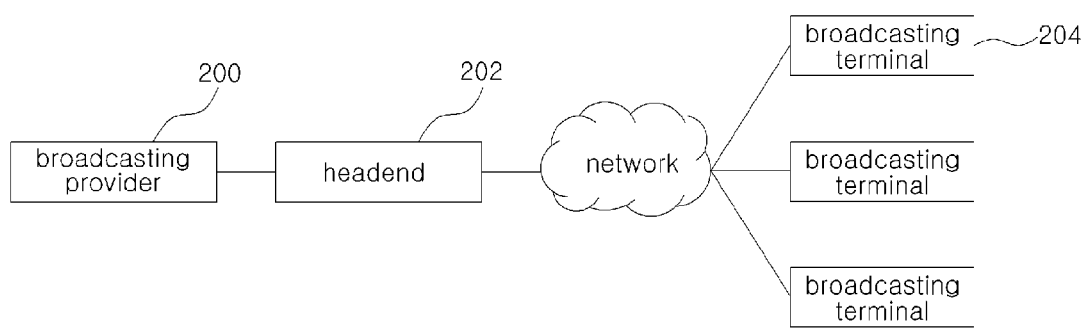
FIG. 1 is a block diagram illustrating a contents list for a conventional technique.
FIG. 2 is a view illustrating a system for providing a virtual channel service according to one example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 2 is a view illustrating a system for providing a virtual channel service according to one example embodiment of the present invention.

In FIG. 2, the system for providing a virtual channel service of the present embodiment includes a broadcasting provider 200, a headend 202 and at least one broadcasting terminal 204.

The broadcasting terminal 204 is connected to the headend 202 through a network.

The broadcasting provider 200 produces various contents, and provides the contents to the headend 202.

The headend 202 performs a schedule management concerning the broadcasting contents, an encoding of an audio signal and a video signal, an individual or interworking application management and encoding for additional service, and a scrambling function for blocking approach of other people except a user.

Additionally, the headend 202 includes extra communication server, e.g. return path server for processing the request of the user through an uplink channel, and may provide an internet service and various communication services using the extra communication server.

Hereinafter, a digital broadcasting service, in which the broadcasting contents are encoded to a predetermined format (for example, MPEG-2) transmission stream and the encoded broadcasting contents are provided, will be assumed as a service provided by the headend 202 for convenience of description. However, it would be known to one of the ordinary skill in the art that the service provided by the headend 202 is not limited as the digital broadcasting service.

Accordingly, the headend 202 includes elements for providing the digital broadcasting service, but is not limited as the above elements. For example, the headend 202 may provide an analog terrestrial broadcasting service, a cable broadcasting service and a satellite broadcasting service.

In one example embodiment of the present invention, the headend 202 may transmit a virtual channel service application to the broadcasting terminal 204 in accordance with request of the broadcasting terminal 204 as described below.

The broadcasting terminal 204 services the recorded contents through a preset virtual channel, and may be a set-top box. However, the broadcasting terminal 204 is not limited as the set-top box as long as it provides the virtual channel service through a certain application, etc.

Figure 4:
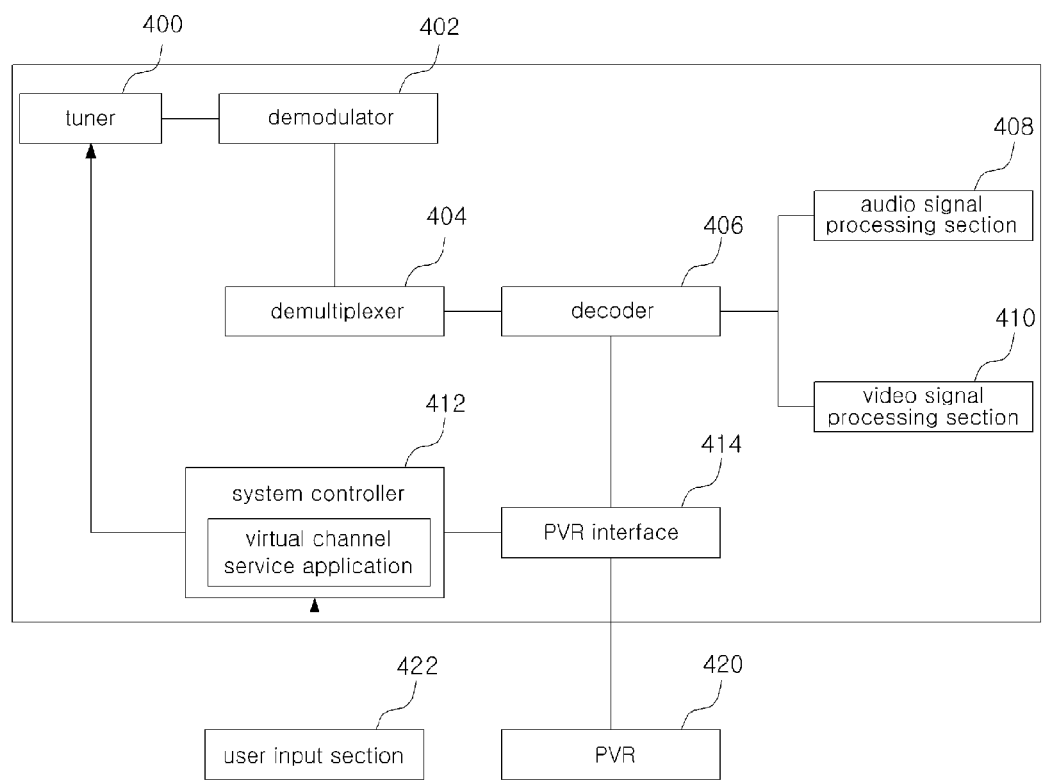
FIG. 4 is a view illustrating a broadcasting terminal according to one example embodiment of the present invention.

Hereinafter, it will be assumed that the virtual channel service application is set in the broadcasting terminal 204 as shown in FIG. 4 for the purpose of convenience of the description. In addition, the broadcasting terminal 204 is assumed as the set-top box independent from a personal video recorder PVR.

Figure 6:
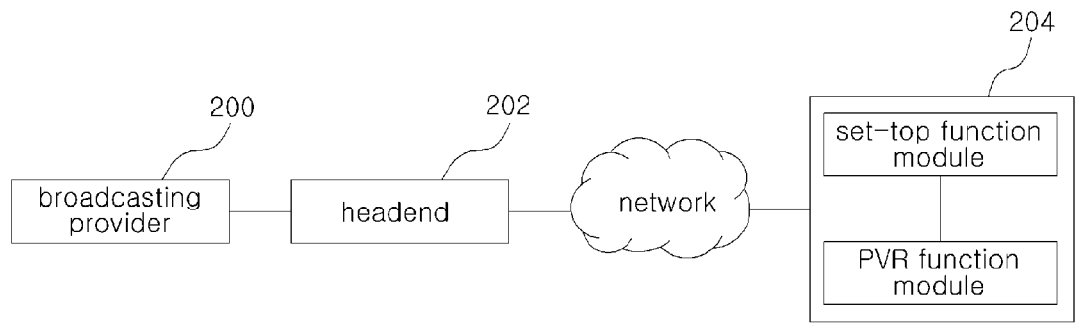
FIG. 6 is a view illustrating a PVR included in a set-top box according to one example embodiment of the present invention.
Figure 7:
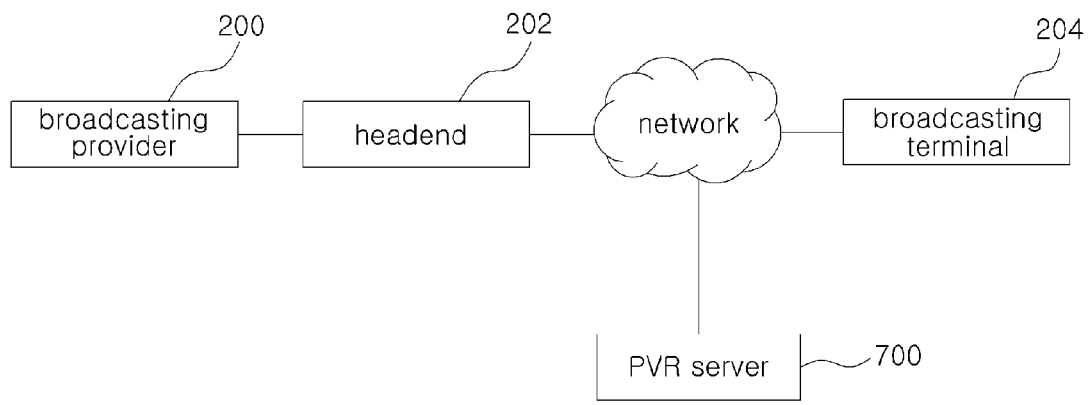
FIG. 7 is a view illustrating a PVR server connected a set-top box through a network according to one example embodiment of the present invention.

However, the broadcasting terminal 204 is not limited as the above set-top box, and may be a set-top box including the PVR or a set-top box interworking with the PVR connected through the network as shown in FIG. 6 and FIG. 7.

Furthermore, if the PVR can execute the virtual channel service application, the PVR may be the broadcasting terminal 204 of the present invention.

In one example embodiment of the present invention, the broadcasting terminal 204 plays back one or more contents recorded in a hard disk or a memory through a virtual channel. Here, the virtual channel indicates a channel not assigned as a broadcasting channel, and means a channel for playing back exclusively only the recorded contents not a physical channel. The broadcasting channel indicates a channel assigned for a broadcasting program transmitted from for example a broadcasting station through a network. Generally, each of program providers has exclusive broadcasting channel.

The virtual channel may be preset by a provider, etc. or set directly by a user.

In one example embodiment of the present invention, the broadcasting terminal 204 may play back the recorded contents through the virtual channel or maintain a playback standby state though the user does not request the playback.

The broadcasting terminal 204 assigns the virtual channel for the recorded contents for the user to approach easily to the virtual channel through a channel changing method, like in the broadcasting channel.

Figure 3:
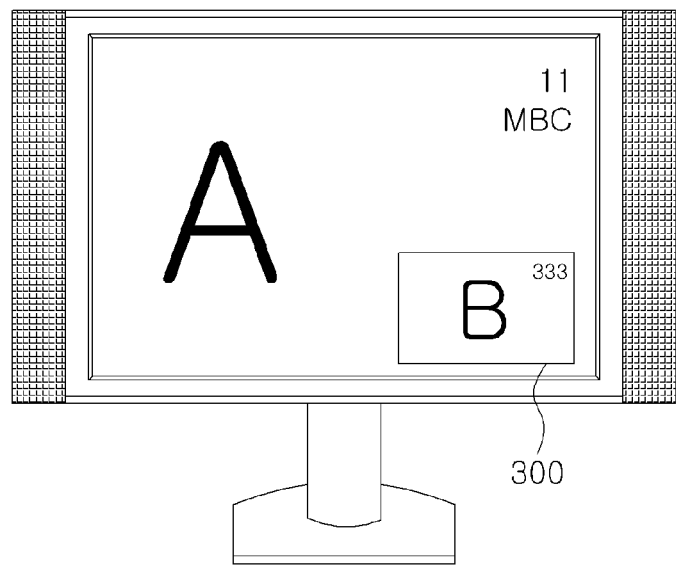
FIG. 3 is a view illustrating a PIP area in which the recorded contents are displayed according to one example embodiment of the present invention.

In one example embodiment of the present invention, the broadcasting terminal 204 may display a sub-picture area 300 for the virtual channel while the user views the broadcasting channel as shown in FIG. 3. Here, the sub-picture area 300 may be a picture in picture PIP.

Hereinafter, the sub-picture area 300 will be assumed as the PIP area.

The recorded contents being played back through the present virtual channel is displayed on the PIP area 300. In this case, the user may verify directly the recorded contents being played back at present through the PIP area 300 while he views the broadcasting channel. Moreover, the user may view the recorded contents through the channel changing method.

FIG. 4 is a view illustrating the broadcasting terminal according to one example embodiment of the present invention. In FIG. 4, the set-top box is independent from the PVR.

In FIG. 4, the set-top box of the present embodiment includes a tuner 400, a demodulator 402, a demultiplexer 404, a decoder 406, an audio signal processing section 408, a video signal processing section 410, a system controller 412 and a PVR interface 414.

The tuner 400 receives a broadcasting signal of a channel selected by the user by synchronizing with a frequency corresponding to the channel.

The demodulator 402 demodulates the broadcasting signal received to the tuner 400. Here, the demodulated broadcasting signal may include an audio signal, a video signal and data.

The demultiplexer 404 extracts the audio signal, the video signal and the data from the demodulated broadcasting signal through a demultiplexing process and a section filtering process.

The digital broadcasting provides usually the broadcasting signal encoded to a MPEG-2 format, and the decoder 406 decodes the audio signal and the video signal having the MPEG-2 format.

The audio signal processing section 408 includes a digital analog converter DAC, converts the decoded audio signal into an analog signal, and outputs the analog signal.

The video signal processing section 410 includes a graphic overlay and a graphic processor, processes the decoded video signal, and outputs the processed signal to a display section.

The system controller 412 connects to a user input section such as a remote controller through wire or wireless communication, and performs control functions such as playing back of the recorded contents through the virtual channel in accordance with execution of a virtual channel service application and display/removal of the PIP area 300 in case that the user requests the functions or the set-top box is turned on.

The PVR interface 414 connected to the PVR 420 independent from the set-top box, receives the recorded contents from the PVR 420 in case that the playback of the recorded contents is requested in accordance with the execution of the virtual channel service application, and outputs the received recorded contents to the decoder 406.

The PVR interface 414 may interwork with a PVR function module 600 included in the broadcasting terminal 204 or external PVR server 700.

The PVR 420 includes a tuner, an ADC, an MPEG encoder and a hard disk, converts a broadcasting signal outputted through the tuner into a digital signal, compresses the digital signal, and then stores the compressed digital signal.

The set-top box may provide the virtual channel service by interworking with the PVR 420 in case that the contents recorded through various methods such as an automatic recording, a recommended recording or a series recording, etc., in the PVR 420.

Figure 5:
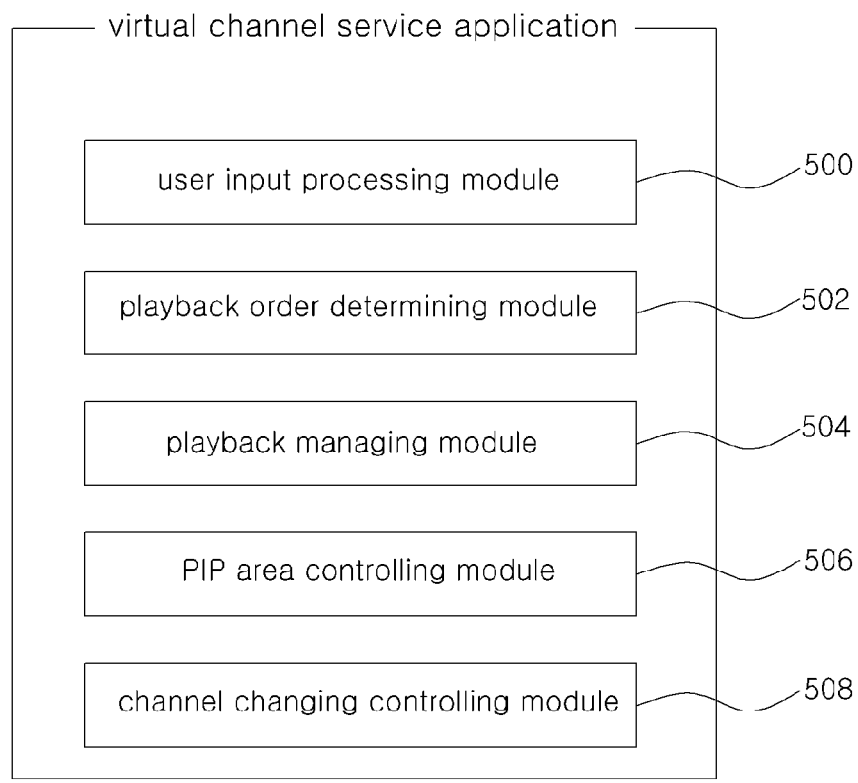
FIG. 5 is a view illustrating the virtual channel service application according to one example embodiment of the present invention.

FIG. 5 is a view illustrating the virtual channel service application according to one example embodiment of the present invention.

In FIG. 5, the virtual channel service application of the present embodiment includes a user input processing module 500, a playback order determining module 502, a playback managing module 504, a PIP area controlling module 506 and a channel changing controlling module 508.

The virtual channel service application may be loaded to a random access memory (RAM, not shown) connected to the system controller 412 in case that the user requests the execution of the application or the set-top box is turned on, and then be executed.

The user input processing module 500 outputs an interface for setting of virtual channel number in case that the user can set freely the virtual channel number, and stores the virtual channel number inputted by the user through the interface.

The playback order determining module 502 determines a playback order of the recorded contents to be played back through the virtual channel in case that the user requests the playback of the recorded contents or the set-top box is turned on.

In one example embodiment of the present invention, the playback order is not fixed, and may be determined dynamically in accordance with various parameters.

The playback order determining module 502 may determine the order through one or more of a present time, a day, an attribution of the recorded contents, relation to the contents of the broadcasting channel being viewed at preset by the user and a recording day, or their combination. Here, the playback order determining module 502 may set weights about the recorded contents through the parameters, and determine the order so that the recorded contents having higher weight is firstly played back.

For example, the playback order determining module 502 may set the order so that the contents having a playback time next to the present time of the recorded contents has higher weight.

In addition, the playback order determining module 502 may determine the order according as the present day is a weekday or a weekend. For example, the playback order determining module 502 may set the order so that the recorded contents corresponding to a series has higher weight in case of the weekend.

Furthermore, the playback order determining module 502 may set the order so that the recorded contents, related to the contents being viewed at present through the broadcasting channel by the user, has higher weight.

For instance, in case that the user is viewing tenth A contents, the playback order determining module 502 may set the order so that ninth A contents of the recorded contents has higher weight.

Additionally, the playback order determining module 502 may set the order so that the recorded contents having the same genre as the contents being viewed at present has higher weight.

The playback managing module 504 plays back in sequence the recorded contents in accordance with the determined playback order. Here, the recorded contents are played back through the virtual channel.

It is desirable that the playback managing module 504 displays preferentially the virtual channel irrespective of the channel viewed previously by the user in case that the set-top box is turned on. Accordingly, the user may view directly the recorded contents.

Since the recorded contents interested by the user are firstly displayed, the satisfaction of the user may be enhanced.

The PIP area controlling module 506 displays the sub-picture area, i.e. PIP area 300 for displaying the recorded contents through the virtual channel as shown in FIG. 3 in case that the user views the broadcasting channel.

In one example embodiment of the present invention, the PIP area controlling module 506 may output selectively the PIP area 300 only when a preset condition is satisfied.

For example, the PIP area controlling module 506 may control to display the PIP area 300 during a predetermined period of time when playback of one of the recorded contents is started or playback of the recorded contents related to the contents being viewed at preset is started.

The user may verify the recorded contents, being played back at present through the virtual channel, through the PIP area 300, and view the recorded contents through a method of inputting number of the virtual channel or a method of using channel up/down keys while he views the broadcasting channel.

In one example embodiment of the present invention, the PIP area controlling module 506 may display the PIP area 300, for displaying the contents played back through the broadcasting channel, while the user views the recorded contents through the virtual channel.

It is desirable that the PIP area controlling module 506 may display the contents of the broadcasting channel, viewed just before the user changes to the virtual channel, on the PIP area 300 in case that the user changes the broadcasting channel to the virtual channel while he views the broadcasting channel.

The channel changing controlling module 508 controls the channel changing to the virtual channel from the broadcasting channel or the channel changing to the broadcasting channel from the virtual channel.

The channel changing controlling module 508 stores a playback position information (information concerning position before the channel is changed) of the recorded contents played back through the virtual channel in case that the user requests the channel changing to the broadcasting channel, and then plays back again the recorded contents from the position in case that he requests the channel changing to the virtual channel.

That is, the channel changing controlling module 508 pauses temporarily the recorded contents played back through the virtual channel in case that the user requests the channel changing to the broadcasting channel while he views the recorded contents.

As described above, the set-top box of the present embodiment plays back preferentially the recorded contents having high possibility to be selected by the user through the virtual channel service application. In this case, the user verifies the recorded contents through the PIP area 300 while he views the broadcasting channel.

Hereinafter, a process of providing the virtual channel service of the present embodiment will be described in detail with reference to accompanying drawing FIG. 8.

Figure 8:
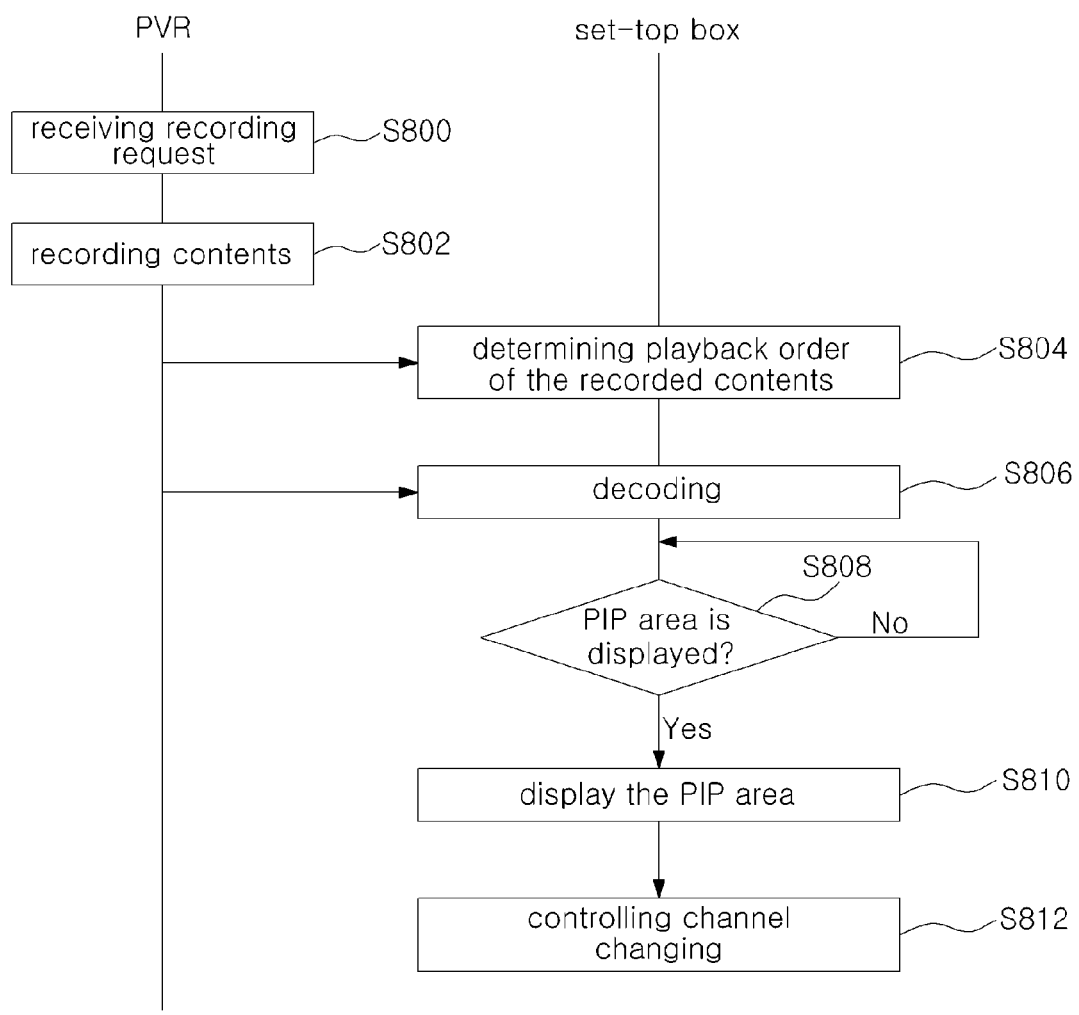
FIG. 8 is a flowchart illustrating a process of providing a virtual channel service according to one example embodiment of the present invention.

FIG. 8 is a flowchart illustrating a process of providing the virtual channel service according to one example embodiment of the present invention.

In FIG. 8, the PVR receives the recording request of the user in step S800, and records contents of corresponding broadcasting channel in accordance with the request in step S802. Here, the PVR may be the PVR function module 600 independent from the set-top box or included in the set-top box as shown in FIG. 6, or the PVR server 700 connected to the set-top box through the network.

In step S804, the set-top box determines the playback order of the recorded contents in the period of preset time or at a time at which it is turned on in case that a plurality of contents are recorded. Here, the order may be dynamically determined by using the present time, a day, etc.

In step S806, the set-top box decodes in sequence the recorded contents in the PVR in accordance with the determined order, and plays back the decoded contents.

In step S808, it is determined whether or not the set-top box displays the PIP area.

The step S808 may be performed when the user views the broadcasting channel, be performed in accordance with case as to whether or not the playback of one of the recorded contents is started in accordance with a predetermined condition, or be performed case as to whether or not the playback of the recorded contents related to the broadcasting channel is started.

In step S810, in case that it is determined to display the PIP area, the set-top box outputs the PIP area for the virtual channel with displaying contents of the broadcasting channel.

In step S812, the set-top box controls the channel changing to the broadcasting channel from the virtual channel and the channel changing to the virtual channel from the broadcasting channel in accordance with the channel changing request of the user.

Figure 9:
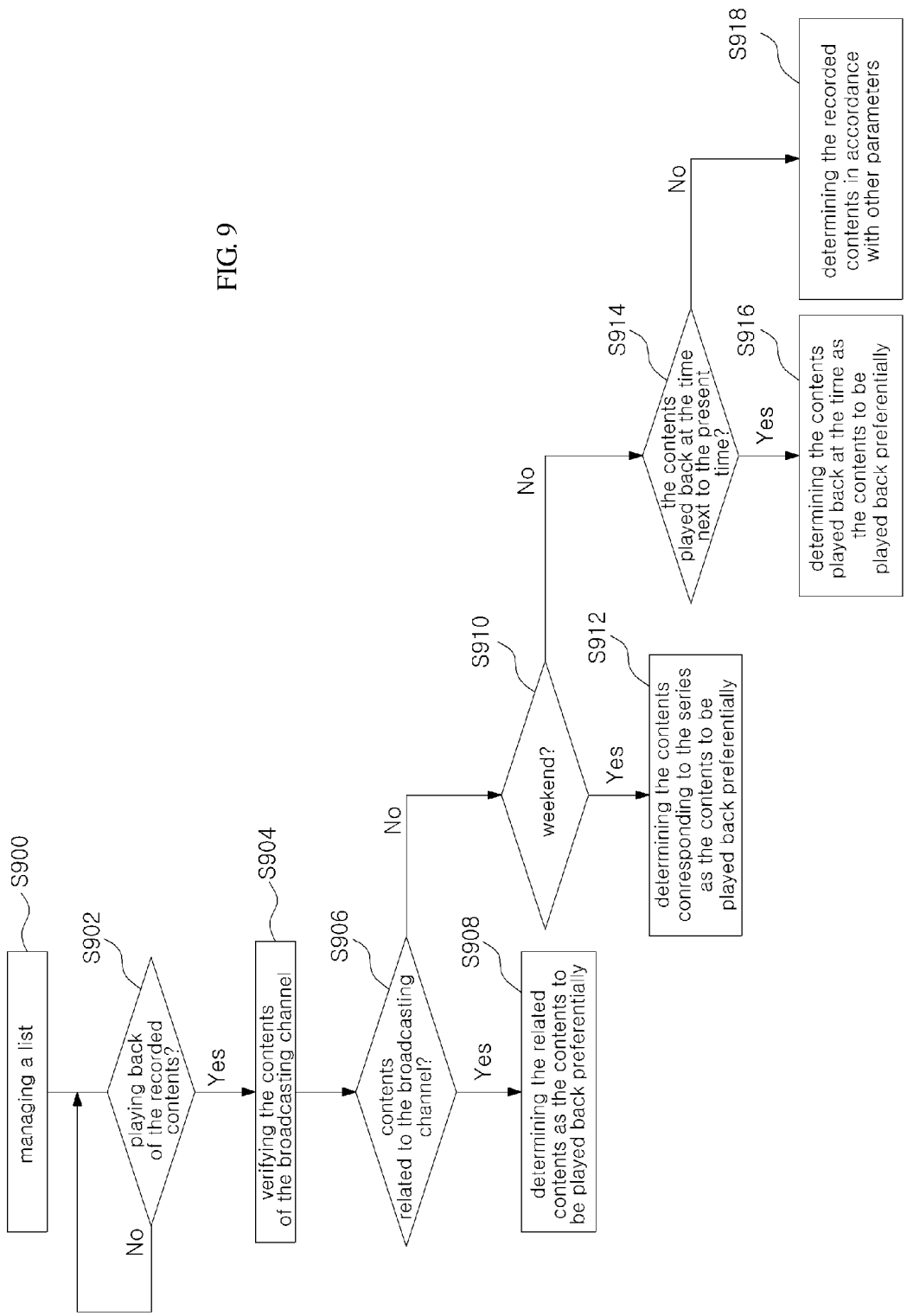
FIG. 9 is a flowchart illustrating a process of determining a playback order according to one example embodiment of the present invention.

FIG. 9 is a flowchart illustrating a process of determining the playback order according to one example embodiment of the present invention.

In FIG. 9, the virtual channel service application set in the set-top box manages a recording list in real time in step S900, and determines whether or not the set-top box plays back the recorded contents through the virtual channel in step S902.

In the step S902, the virtual channel service application determines whether or not the set-top box plays back the recorded contents according as the set-top box is turned on or the user requests the playback.

In step S904, the virtual channel service application verifies the present time, a day and information concerning the contents played back through the broadcasting channel in case that the playback of the recorded contents is needed.

The playback order of the recorded contents may be determined in the order of relation to the contents played back through the present broadcasting channel, the day and the present time.

In step S906, the virtual channel service application verifies whether or not the recorded contents, related to the contents played back through the present broadcasting channel, of the recorded contents is stored.

In step S908, in case that the related recorded contents are stored, the related recorded contents is determined as the recorded contents to be played back preferentially. Here, the related recorded contents may be (n−1)th contents before the nth contents of the broadcasting channel or contents having the same genre as the contents of the broadcasting channel. Here, n is integer of above 2.

In step S910, in case that the related recorded contents are not stored, the virtual channel service application verifies whether or not today is a weekend.

In step S912, in case that today is the weekend, the application determines the recorded contents corresponding to the series as the contents to be played back preferentially.

In step S914, in case that the recorded contents to be played back preferentially is not determined through the steps S906 to S910, the application verifies whether or not the recorded contents played back at a time next to the present time exists.

In step S916, in case that the recorded contents played back at the time exists, the recorded contents played back at the time are determined as the contents to be played back preferentially.

However, in case that the recorded contents played back at the time do not exist, the recorded contents to be played back preferentially are determined in accordance with other parameters in step S918.

In above description, the broadcasting terminal 204 plays back the recorded contents through the virtual channel.

Figure 10:
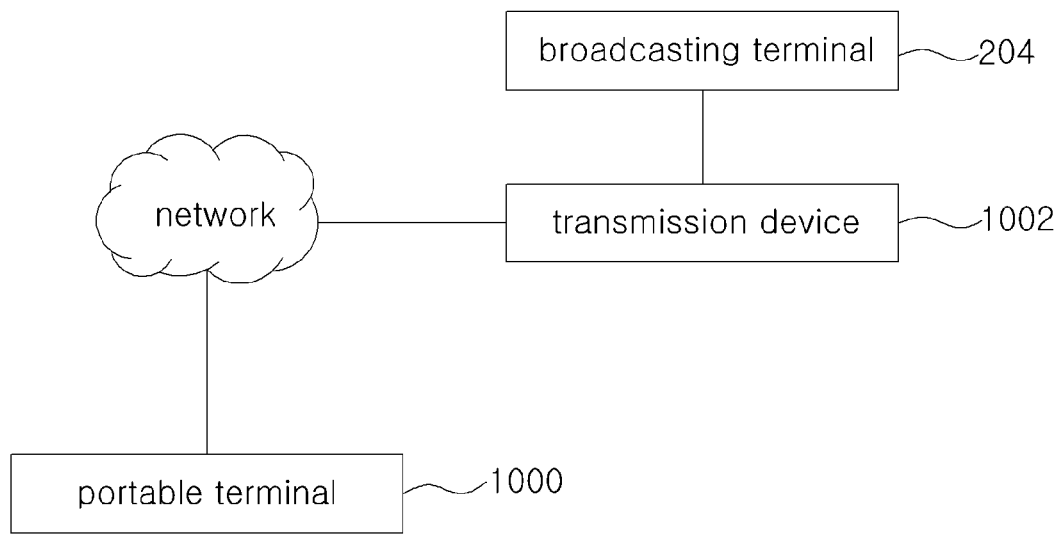
FIG. 10 is a view illustrating a system for a virtual channel service according to another example embodiment of the present invention.

FIG. 10 is a view illustrating a system for a virtual channel service according to another example embodiment of the present invention.

In FIG. 10, the broadcasting terminal 204 of the present embodiment may transmit recorded contents to other portable terminal 1000 through a network.

The broadcasting terminal 204 is connected to a transmission device 1002.

The transmission device 1002 converts the recorded contents into data to be transmitted through the network, and then transmits the data to the portable terminal 1000.

For example, in case of the network based on Internet Protocol IP, the transmission device 1002 converts the recorded contents into IP data, and then transmits the IP data to the portable terminal 1000.

The portable terminal 100 of the present embodiment may be a terminal for playing back a moving picture provided through a certain channel, like the conventional digital multimedia broadcasting DMB terminal.

In one example embodiment of the present invention, a user having the portable terminal 1000 may view the recorded contents by requesting the channel changing to the preset virtual channel, like the conventional broadcasting.

Since the recorded contents are provided through the virtual channel, the user may view the recorded contents through a simple method of selecting the channel without inputting a complicated menu so as to view the recorded contents at a remote place.

In above description, the transmission device 1002 is independent from the broadcasting terminal 204. However, the broadcasting terminal 204 may include a module for converting the recorded contents into data and transmitting the data.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A method of providing a virtual channel service in a broadcasting terminal, the method comprising:
maintaining a list of contents recorded by a personal video recorder and a virtual channel information based on recording requests received on the personal video recorder from a user;
determining a playback order of recorded contents included in the list in accordance with a preset algorithm using weight for the recorded contents, wherein at least one recorded content related to a content being viewed at present through a broadcasting channel by the user has higher weight;

playing back in sequence the recorded contents through a predetermined virtual channel; and displaying the recorded contents played back through the virtual channel on a sub-picture area while a user views the broadcasting channel, wherein the sub-picture area displaying recorded contents previously recorded by the user is displayed during a preset period of time when playback of one of the recorded contents is started or playback of the recorded contents related to contents of the broadcasting channel being viewed at present by the user is started, the recorded contents related to contents of the broadcasting channel being viewed at present by a user including (n−1)th contents before a nth contents of the broadcasting channel or contents having the same genre as the contents of the broadcasting channel, and wherein when there are recorded contents related to a content of the broadcasting channel currently being viewed by a user among the recorded contents included in the list, the related recorded contents are determined to be contents to be played back preferentially.

2. The method of claim 1, wherein the virtual channel is firstly displayed in case that the broadcasting terminal is turned on.

3. The method of claim 1, further comprising:
displaying the contents played back through a broadcasting channel on a sub-picture area while a user views the recorded contents through the virtual channel.

4. The method of claim 1, wherein the recorded contents played back through the virtual channel is temporarily paused in case that a user requests a channel changing to a broadcasting channel while the user views the virtual channel.

5. The method of claim 1, wherein the playback order is differently determined in accordance with a case as to whether a present day is a weekday or weekend, a case as to whether or not the recorded contents correspond to a series, a case as to whether or not (n−1)th contents prior to nth contents of the broadcasting channel being viewed at present is recorded.

6. The method of claim 1, further comprising:
transmitting the recorded contents provided through the virtual channel to a portable terminal located at a remote place,
wherein the portable terminal outputs the recorded contents by selecting the virtual channel through a channel changing method.

7. A non-transitory recording media readable by a digital processor and storing program code, which when executed by the digital processor performs steps of providing a virtual channel service comprising:
maintaining a list of contents recorded by a personal video recorder and a virtual channel information based on recording requests received on the personal video recorder from a user;
determining a playback order of recorded contents included in the list in accordance with a preset algorithm using weight for the recorded contents, wherein at least one recorded content related to a content being viewed at present through a broadcasting channel by the user has higher weight;
playing back in sequence the recorded contents through a predetermined virtual channel; and
displaying the recorded contents played back through the virtual channel on a sub-picture area while a user views the broadcasting channel,
wherein the sub-picture area displaying recorded contents previously recorded by the user is displayed during a preset period of time when playback of one of the recorded contents is started or playback of the recorded contents related to contents of the broadcasting channel being viewed at present by the user is started, the recorded contents related to contents of the broadcasting channel being viewed at present by the user includes (n−1)th contents before a nth contents of the broadcasting channel or contents having the same genre as the contents of the broadcasting channel, and
wherein when there are recorded contents related to a content of the broadcasting channel currently being viewed by a user among the recorded contents included in the list, the related recorded contents are determined to be contents to be played back preferentially.

8. A method of providing a virtual channel service in a server connected to a broadcasting terminal through a network, the method comprising:
receiving transmission request of a virtual channel service application from the broadcasting terminal; and
transmitting the requested virtual channel service application to the broadcasting terminal,
wherein the virtual channel service application determines a playback order of recorded contents displaying recorded contents recorded by a user in accordance with a preset algorithm using weight for the recorded contents, wherein at least one recorded content related to a content being viewed at present through a broadcasting channel by the user has higher weight, plays back in sequence the recorded contents through a predetermined virtual channel, and displays the recorded contents played back through the virtual channel on a sub-picture area while a user views the broadcasting channel,
wherein the sub-picture area displaying recorded contents previously recorded by the user is displayed during a preset period of time when playback of one of the recorded contents is started or playback of the recorded contents related to contents of the broadcasting channel being viewed at present by the user is started, the recorded contents related to contents of the broadcasting channel being viewed at present by the user includes (n−1)th contents before a nth contents of the broadcasting channel or contents having the same genre as the contents of the broadcasting channel, and
wherein when there are recorded contents related to a content of the broadcasting channel currently being viewed by a user among the recorded contents included in the list, the related recorded contents are determined to be contents to be played back preferentially.

9. A broadcasting terminal comprising:
a tuner configured to output selectively a broadcasting signal of a broadcasting channel selected by a user;
a demultiplexer configured to output selectively an audio signal and a video signal from the outputted broadcasting signal;
a decoder configured to decode the audio signal and the video signal in accordance with a preset algorithm, and output the decoded signal; and
a system controller configured to output a control signal corresponding to request of the user,
wherein the system controller determines a playback order of recorded contents displaying recorded contents previously recorded by a user on a personal video recorder in accordance with a predetermined algorithm using weight for the recorded contents, wherein at least one recorded content related to a content being viewed at present through a broadcasting channel by the user has higher weight, and output the control signal for playing back in sequence the recorded contents through a predetermined virtual channel, and displays the recorded contents played back through the virtual channel on a sub-picture area while the user views a broadcasting channel, wherein the sub-picture area displaying recorded contents previously recorded by the user is displayed during a preset period of time when playback of one of the recorded contents is started or playback of the recorded contents related to contents of the broadcasting channel being viewed at present by the user is started, the recorded contents related to contents of the broadcasting channel being viewed at present by the user includes (n−1)th contents before a nth contents of the broadcasting channel or contents having the same genre as the contents of the broadcasting channel, and wherein when there are recorded contents related to a content of the broadcasting channel currently being viewed by a user among the recorded contents included in the list, the related recorded contents are determined to be contents to be played back preferentially.

10. The broadcasting terminal of claim 9, wherein the system controller includes:

a playback order determining module configured to determine a playback order of the recorded contents included in a contents list in accordance with the algorithm; and a playback managing module configured to control the playing back of the recorded contents in accordance with the determined playback order.

* * * * *